United States Patent
Xue

(10) Patent No.: US 10,309,984 B2
(45) Date of Patent: Jun. 4, 2019

(54) HIGH-PRECISION PENDULOUS ACCELEROMETER

(71) Applicant: Institute of Geology and Geophysics, Chinese Academy of Sciences, Beijing (CN)

(72) Inventor: Xu Xue, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/022,331

(22) Filed: Jun. 28, 2018

(65) Prior Publication Data

US 2018/0306835 A1    Oct. 25, 2018

Related U.S. Application Data

(63) Continuation-in-part of application No. PCT/CN2016/085032, filed on Jun. 7, 2016.

(30) Foreign Application Priority Data

Feb. 25, 2016    (CN) .......................... 2016 1 0105847

(51) Int. Cl.
  *G01P 15/08*    (2006.01)
  *G01P 15/13*    (2006.01)
  *G01P 15/125*   (2006.01)

(52) U.S. Cl.
  CPC .............. *G01P 15/13* (2013.01); *G01P 15/08* (2013.01); *G01P 15/125* (2013.01); *G01P 15/131* (2013.01)

(58) Field of Classification Search
  CPC ..... G01P 15/125; G01P 15/132; G01P 15/131; G01P 15/11; G01P 15/13; G01P 15/08
  See application file for complete search history.

(56) References Cited

U.S. PATENT DOCUMENTS 3,877,313 A * 4/1975 Ferriss ................. G01P 15/131
                                        73/514.05
4,062,004 A * 12/1977 Roantree ............... G01C 19/04
                                        318/590
(Continued)

FOREIGN PATENT DOCUMENTS

CN    2541847 Y    3/2003
CN    2638030 Y    9/2004
(Continued)

OTHER PUBLICATIONS

Juan Fu, "Study on Micro-accelerometer Based on Sigma-Delta Modulation", Jun. 2009, Master's Degree Thesis, Tianjin Univiersity.
(Continued)

*Primary Examiner* — Helen C Kwok
(74) *Attorney, Agent, or Firm* — Novick, Kim & Lee, PLLC; Allen Xue

(57) ABSTRACT

Provided is a quartz pendulous accelerometer including a quartz meter configured to sense an acceleration signal, convert the acceleration signal into an inertia torque, and convert the inertia torque into a quartz meter output signal; a readout apparatus configured to convert the meter output signal into an input signal recognizable by a pulse generating apparatus; and a pulse generating apparatus configured to perform control algorithm conversion, oversampling and digital quantization on the input signal to obtain a quantized current pulse, which is converted into an electromagnetic pulse torque for balancing the inertia torque.

21 Claims, 9 Drawing Sheets

(56) References Cited

U.S. PATENT DOCUMENTS

| | | | |
|---|---|---|---|
| 4,182,187 A | | 1/1980 | Hanson |
| 4,200,925 A | * | 4/1980 | Cushman ............... G01C 19/30 |
| | | | 318/562 |
| 4,987,779 A | | 1/1991 | McBrien |
| 5,277,053 A | * | 1/1994 | McLane ................ G01P 15/131 |
| | | | 702/109 |
| 5,454,266 A | * | 10/1995 | Chevroulet ........... G01P 15/131 |
| | | | 73/514.18 |
| 5,473,946 A | * | 12/1995 | Wyse .................... G01P 15/125 |
| | | | 73/514.18 |
| 5,497,660 A | * | 3/1996 | Warren ................. G01P 15/125 |
| | | | 73/514.18 |
| 5,852,242 A | * | 12/1998 | Devolk ................... G01P 1/006 |
| | | | 73/514.17 |
| 6,073,490 A | | 6/2000 | Konovalov et al. |
| 6,101,864 A | | 8/2000 | Abrams et al. |
| 6,360,602 B1 | * | 3/2002 | Tazartes ................ G01P 15/125 |
| | | | 73/1.38 |
| 6,386,032 B1 | * | 5/2002 | Lemkin ................ G01P 15/125 |
| | | | 73/504.02 |
| 7,155,979 B2 | * | 1/2007 | Lasalandra ........ G02B 26/0841 |
| | | | 324/661 |
| 2008/0295597 A1 | * | 12/2008 | Stewart ................ G01P 15/125 |
| | | | 73/514.18 |
| 2014/0324367 A1 | | 10/2014 | Garvey, III et al. |
| 2015/0316667 A1 | * | 11/2015 | Projetti .................... G01V 1/18 |
| | | | 367/15 |

FOREIGN PATENT DOCUMENTS

| | | |
|---|---|---|
| CN | 101266260 A | 9/2008 |
| CN | 101592677 A | 12/2009 |
| CN | 201749128 U | 2/2011 |
| CN | 102486401 A | 6/2012 |
| CN | 102520209 B | 6/2012 |
| EP | 0645634 B1 | 10/1997 |
| JP | S6126627 B | 6/1986 |
| JP | H04264265 A | 9/1992 |
| JP | 2851673 B2 | 1/1999 |
| JP | 3137843 B2 | 2/2001 |
| JP | 2001066323 A | 3/2001 |
| JP | 3371246 B2 | 1/2003 |
| JP | 2011027445 A | 2/2011 |
| WO | 2016162986 A1 | 10/2016 |

OTHER PUBLICATIONS

Lin Lang, "Study of the temperature error model and the technology for compensating temperature of the quartz flexible accelerometer", Nov. 2009, Master's Degree Thesis, National University of Defense Technology.

* cited by examiner

HIGH-PRECISION PENDULOUS ACCELEROMETER

CROSS-REFERENCE TO RELATED APPLICATIONS

The present application is a continuation in part application of international application No. PCT/CN2016/085032 filed on Jun. 7, 2016, and claims priority to Chinese patent application No. 201610105847.5 filed on Feb. 25, 2016, the disclosures of which are hereby incorporated by reference in their entirety.

TECHNICAL FIELD

The present disclosure relates to an accelerometer, and particularly to a high-precision pendulous accelerometer.

BACKGROUND

A quartz pendulous accelerometer, or a quartz accelerometer for short, is a force balance type acceleration sensor. It has been widely used in inertial navigation, measurement while drilling (MWD) and measurement while logging (LWD) in oil and gas exploration. Compared with accelerometers employing other working principles, the quartz pendulous accelerometer accounts for most of the market share in the fields of inertial navigation, MWD and other fields due to its advantages in terms of price, precision, environmental adaptability and other performance characteristics.

The quartz pendulous accelerometer is mainly composed of an acceleration sensing device, i.e., the quartz meter, a servo processing circuit, and an output circuit. The quartz meter includes a quartz pendulum, a torquer yoke, a torquer coil, and a magnet. Among them, the quartz pendulum and end faces of the torquer yoke make up a differential capacitors with the upper gold-plated face and the lower gold-plated face of the quartz pendulum acting as movable polar plates of the differential capacitors while the torquer yoke act as stationary polar plates of the differential capacitors. After receiving an external acceleration signal, the quartz pendulum swings due to an inertial force so that capacitance values of the differential capacitors change. The change in the differential capacitance is converted into a change of a voltage signal by means of a Capacitance to Voltage (C-V) readout circuit of a servo circuit. A signal conditioning circuit then outputs a driving current to a torquer through the torquer coil to create a balancing force (balancing torque), which counter-balances the inertial force (inertial torque) generated by the external inertia acceleration so as to reach the balance of force in the closed-loop system. Further, a magnitude of the feedback current input to the coil is directly proportional to the value of the input inertia acceleration so that the acceleration can be calculated.

The traditional servo processing circuit includes a C-V readout circuit, a proportional-integral-derivative (PID) control circuit, a transconductance amplifier, a feedback circuit and other modules, which mainly accomplishes the conversion of the physical properties (C-V), signal conditioning of the closed-loop system under static and dynamic conditions, voltage-current conversion, and the driving ability.

The servo processing circuit includes an analog negative feedback circuit, in which an analog current is employed in a feedback current driving mode and a pulse servo negative feedback circuit, in which a pulse current is employed in a feedback current driving mode. In addition, the pulse current in turn includes a width-modulated pulse, an intermittent pulse, etc.

The output circuit (digital quantization) is mainly to solve a digitization problem of the accelerometer. Currently, the traditional output circuit adopts a current-frequency (I-F) conversion circuit or an analog/digital (A/D) conversion circuit solution. The I-F conversion circuit solution accomplishes measurement digitization) of the output current using an integrator and a constant-current source to convert a current signal into a frequency signal, so as to facilitate navigation calculation by a navigation computer. On the other hand, the A/D conversion circuit converts the output current signal into a voltage signal by means of a sampling resistor, and further convert the voltage signal into a digital signal using an analog-to-digital conversion (ADC) chip.

One of the existing technologies uses the capacitance detection, an analog PID control strategy, and an analog negative feedback solution. Digital quantization is realized using an I-F conversion circuit or an A/D conversion circuit. There are the following problems:

1. Circuit scale and cost: before the navigation calculation is performed, the analog output needs to be converted into a digital quantity. The common solution at present is to perform the I-F conversion. Since this method does not require a sampling resistor in the closed-loop system, the I-F conversion circuit has no effect on the measurement range or internal parameters. Moreover, the I-F conversion circuit and the servo circuit are relatively independent and do not affect each other. However, I-F design parameters and the levels of precision directly determine the overall precision level of the quartz pendulous accelerometer. As the I-F conversion circuit is relatively complex in scale, its level of precision extremely susceptible to changes in the ambient temperature and its own parameters, which makes it difficult for system integration and miniaturization or cost reduction.

2. System response: When the output is analog signals, the feedback bandwidth is significantly restricted. In order to achieve fast responses, it is necessary to increase the bandwidth, which would increase the noise level and negatively impact the performance of the whole system, affecting the overall performance level;

3. Dynamic error: When using analog feedback loop, the decrease in the electrical stiffness of the system in the working frequency band reduces the precision of the dynamic response. This is because the electric stiffness and response frequency are correlated, where with the increase in the response frequency, the electric stiffness decreases, resulting in reduced dynamic response precision. In contrast, the present disclosure employs an oversampling digital feedback technique is employed, which increases the electric stiffness of the system within the effective frequency band so that the dynamic response precision of the system is improved.

4. Digital quantization precision: The feedback signal of a PDM (pulse density modulation feedback) accelerometer is a series of pulses with constant amplitudes. The force produced by the torquer, exerted on a movable mass block, is a series of pulses with a constant amplitudes. Each pulse represents an accurate input acceleration increment. When using analog feedback in the accelerometer, the analog output requires analog-to-digital conversion. For example, the I-F conversion circuit is commonly used in the inertial navigation, the ADC conversion is commonly used in the industrial field; I-V-D: a current is converted to a voltage, and then the voltage signal quantity is digitalized). While in a digital feedback accelerometer, the analog-to-digital conversion process is accomplished in an accelerometer system loop. The digital feedback is the control signal and the feedback signal of the system, and thus the error of the analog-to-digital conversion is small.

5. Linearity: the linearity of the traditional analog negative feedback is mainly limited by the linearity of the torquer. In a full-scale range, the driving current change range of the torquer is very large, for example, for a quartz pendulous accelerometer with a measurement range of ±30 g and a scale factor of 1.2 mA/g, in order to distinguish the external input acceleration value of 1 μg, the required torque feedback driving current is $1.2 \text{ mA}*10^{-6}$; and when the external input acceleration is 30 g, the feedback current is 1.2 mA*30, the requirement for the linearity of the torquer in such a large dynamic change range. In addition, the current amplification capability of the constant-current source is tested. The precision of the constant-current source and the linearity of the torquer determine the linearity of the accelerometer. For the digital feedback control, the input acceleration value is modulated into a pulse torque with high speed and a constant amplitude and width, and the input acceleration is quantified into pulse density of the output. As such, the nonlinear problem of the large dynamic current of the torquer is avoided.

In another of the existing technology, pulse density modulation (PDM) or pulse width modulation (PWM) negative feedback is adopted, and the following problems:

This technology is still based on the Nyquist sampling law, and its overall control strategy is still based on the traditional analog feedback solution, and therefore, some dynamic characteristic defects of the analog negative feedback such as dynamic precision and system response still exist. The problem of quantized noise has not been solved, the noise shaping is not achieved, the quantized noise of the digital output is relatively large, the number of bits of the digitized output is not enough, or the precision of the system is lost after the digital quantization.

There is a Dead-Zone or Idle Tones problem that is, the pulse density feedback of this technology, due to low electric stiffness of the system, when the accelerometer is in a weak input signal mode, the output is prone to the instability caused by the ring oscillator noise.

SUMMARY

In order to solve the above problems effectively, the present disclosure adopts a multi-order sigma-delta modulation control method on a control circuit of a quartz pendulous accelerometer. Particularly, a quartz meter of the quartz pendulous accelerometer is embedded as an approximate second-order system into a high-order sigma-delta modulator (called SDM for short). By means of a circuit design and a system stability design of the present disclosure, digital feedback is realized while digitally quantizing a feedback current is implemented; and negative feedback is realized by adopting an oversampling technique, so that the linearity, the dynamic precision, etc. of a closed-loop system are improved. In addition, applying the SDM achieves quantized noise shaping so as to realize purposes of extremely low quantized noise and digital quantity output.

This disclosure provides a quartz pendulous accelerometer that includes:

a quartz meter, which is configured to sense an acceleration signal, and convert the acceleration signal into an inertia torque (or inertia force) and convert the inertia torque into a meter output signal;

a readout apparatus, which is configured to convert the meter output signal into an input signal recognizable by a pulse generating apparatus; and a pulse generating apparatus, which is configured to perform control algorithm conversion, oversampling and digital quantization on the input signal to obtain a quantized current pulse, where the quantized current pulse is converted into an electromagnetic pulse torque for balancing the inertia torque.

Further, the pulse generating apparatus includes a control algorithm unit, an oversampling unit, and a digital quantization unit.

Further, the oversampling unit is configured to perform oversampling on the input signal recognizable by the pulse generating apparatus.

The control algorithm unit is configured to convert the oversampled signal into a control signal.

The digital quantization unit is configured to quantize the control signal into an output bit stream signal.

Further, the control algorithm unit is configured to perform control algorithm conversion to convert the input signal recognizable by the pulse generating apparatus into a control signal.

The oversampling unit is configured to perform oversampling on the control signal.

The digital quantization unit is configured to perform digital quantization to quantize the oversampled control signal into an output bit stream signal.

Further, the quartz pendulous accelerometer further includes an electromagnetic torque pulse control unit.

Further, the electromagnetic torque pulse control unit includes a timing control unit and a constant-current source unit.

Further, the electromagnetic torque pulse control unit receives the quantized current pulse, and the timing control unit determines a direction and a magnitude of an acceleration signal by switching a conduction direction and a number of conduction times of the constant-current source unit by means of timing control, and performs feedback control on an electromagnetic torquer of a quartz meter for balancing the inertia torque.

Further, the quantized current pulse is a bit stream signal, and the bit stream signal is an oversampled modulated signal and includes information about a magnitude and a polarity of a feedback force for balancing the inertia torque.

Further, the meter output signal is a capacitance signal, and the readout apparatus is configured to convert the capacitance signal into a voltage signal recognizable by the pulse generating apparatus.

Further, the control algorithm unit includes a compensation unit, which is configured to perform phase compensation on a closed-loop circuit of the quartz pendulous accelerometer.

Further, the quartz meter mainly includes a quartz pendulum, a torquer yoke, a torquer coil, and a magnet.

The quartz pendulum and end faces of the torquer yoke make up differential capacitors, an upper gold-plated face and a lower gold-plated face of the quartz pendulum act as movable polar plates of the differential capacitors, the torquer yoke act as stationary polar plates of the differential capacitors.

The timing control unit determines a direction and a magnitude of an acceleration signal by switching a direction and a number of times of conducting the coil by the constant-current source unit by means of timing control, and a feedback torque generated by the coil and the magnet balances the inertia torque.

Further, the quartz pendulous accelerometer further includes a filtering and decimating unit, which is configured to perform down-sampling and filtering on the quantized current pulse to output a digital quantity signal.

Provided is a closed-loop control method for a quartz pendulous accelerometer, including the following steps:

providing a quartz meter, which is configured to sense an acceleration signal, convert the acceleration signal into an inertia torque and convert the inertia torque into a meter output signal;

converting the meter output signal into an input signal recognizable by a pulse generating apparatus and inputting it to the pulse generating apparatus; and performing control algorithm conversion, oversampling and digital quantization on the input signal to obtain a quantized current pulse, where the quantized current pulse is converted into an electromagnetic pulse torque for balancing the inertia torque.

Further, the pulse generating apparatus sequentially performs oversampling, control algorithm conversion, and digital quantization on the input signal to output a quantized current pulse.

Further, the pulse generating apparatus sequentially performs control algorithm conversion, oversampling, and digital quantization on the input signal to output a quantized current pulse.

Further, the method further includes: providing an oversampling unit, which is configured to perform oversampling on the input signal;

a control algorithm unit, which is configured to convert the oversampled signal into a control signal; and a digital quantization unit, which is configured to quantize the control signal into an output bit stream.

Further, the method further includes: providing a control algorithm unit, which is configured to convert the input signal into a control signal; an oversampling unit, which is configured to convert the control signal into an oversampled control signal; and a digital quantization unit, which is configured to quantize the oversampled control signal into an output bit stream.

Further, the meter output signal is a capacitance signal, and the input signal recognizable by the pulse generating apparatus is a voltage signal.

The capacitance signal is converted into a voltage signal recognizable by the pulse generating apparatus by means of a readout apparatus.

Further, the method further includes: providing an electromagnetic torque pulse control unit, which includes a timing control unit and a constant-current source unit.

The electromagnetic torque pulse control unit receives the quantized current pulse, and the timing control unit determines a direction and a magnitude of an acceleration signal by switching a conduction direction and a number of conduction times of the constant-current source unit by means of timing control, and performs feedback control on an electromagnetic torquer of a quartz meter for balancing the inertia torque.

Further, the method further includes providing a compensation unit, which is configured to perform phase compensation on a closed-loop circuit of the quartz pendulous accelerometer.

Further, the quantized current pulse is a bit stream signal, and the bit stream signal is an oversampled modulated wave, and includes information about a magnitude and a polarity of a feedback force for balancing the inertia torque.

The present disclosure has the beneficial effects: negative feedback is realized by adopting an oversampling technique, so that the linearity, the dynamic precision, etc. of the closed-loop system are greatly improved. In addition, applying a SDM realizes quantized noise shaping to achieve purposes of low noise and digital quantity output. In the present disclosure, the meter of the quartz pendulous accelerometer is embedded as a standard second-order system into a sigma-delta modulator (SDM) loop to form a new high-order (second-order, third-order, fourth-order, fifth-order, sixth-order, etc.) closed-loop system, and difficulties of digital feedback torquing, stability of a high-order sigma-delta closed-loop system, quantized noise optimization design, etc. are solved.

BRIEF DESCRIPTION OF THE DRAWINGS

FIG. 9 panel (b) is a sectional view showing the quartz meter of the quartz pendulous accelerometer; and FIG. 9 panel (c) is a side view showing quartz meter of the quartz pendulous accelerometer.

DETAILED DESCRIPTION

In order to make objectives, technical solutions and advantages of the present disclosure more clearly understood, the present disclosure will now be described in further detail with reference to accompanying drawings and embodiments. It should be understood that specific embodiments described herein are only illustrative of the present disclosure and are not intended to be limiting.

Rather, the present disclosure encompasses any alternatives, modifications, equivalent methods and solutions made within the spirit and scope of the present disclosure as defined by claims. Further, in order to give the public a better understanding of the present disclosure, some specific details are described in detail in the following detailed description of the present disclosure. It will be understood by those skilled in the art that the present disclosure may be understood without reference to the details.

In the prior art, a quartz pendulous accelerometer has an acceleration quartz meter, a servo processing circuit, an output circuit and other portions, where the quartz meter includes a quartz pendulum, a torquer yoke, a torquer coil, a magnet, etc. Among them, the quartz pendulum and end faces of the torquer yoke make up differential capacitors, an upper gold-plated face and a lower gold-plated face of the quartz pendulum act as movable polar plates of the differential capacitors, and the torquer yoke act as stationary polar plates of the differential capacitors. When an external acceleration signal is received, the quartz pendulum swings due to an inertial force, so that capacitance values of the differential capacitors change, and the change of the differential capacitors is converted into a change of a voltage signal by means of a C-V readout circuit of the servo circuit. A corresponding current is fed back and output by means of a signal conditioning circuit and supplied to a torquer through the torquer coil, resulting in a balancing force to offset an inertial force generated by an external inertia acceleration so as to reach the force balance in the closed-loop system. The magnitude of a feedback current input to the torquer is directly proportional to a value of the input acceleration, so that measuring the acceleration is accomplished.

Figure 1:
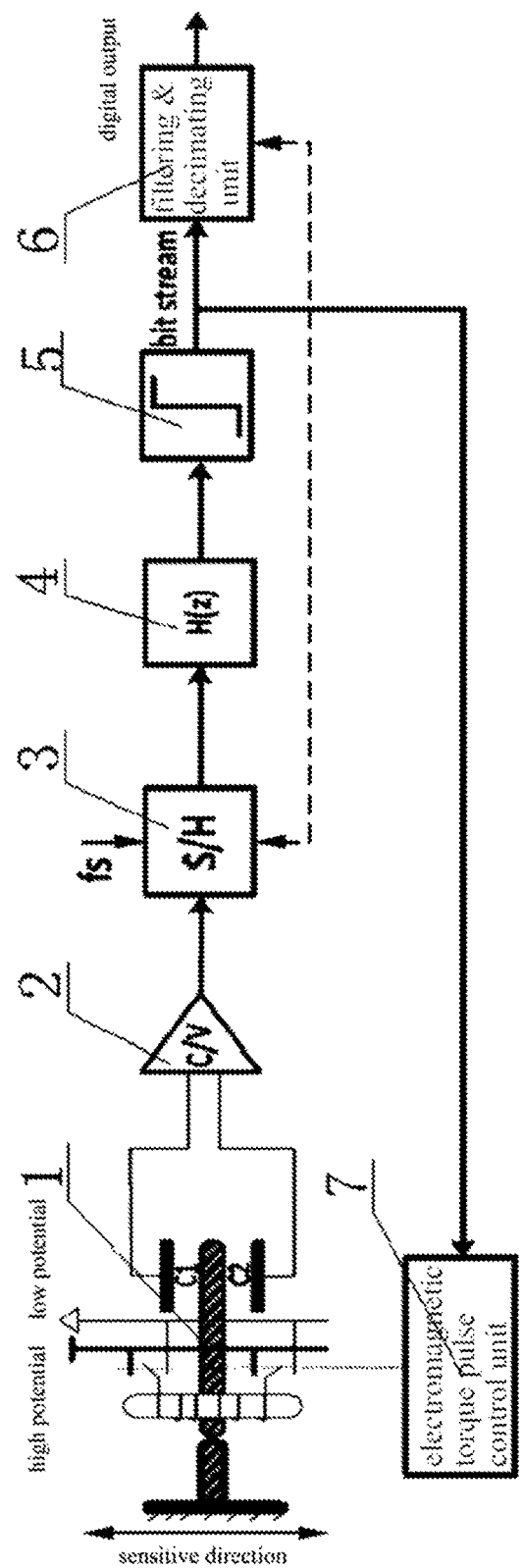
FIG. 1 is a schematic diagram showing a quartz pendulous accelerometer (switching capacitive mode) of the present disclosure.

In the embodiment shown in FIG. 1, a quartz meter of a quartz pendulous accelerometer is embedded a high-order sigma-delta modulator (SDM). By means of a circuit design and a system stability design of the present disclosure, digital feedback is realized while digitally quantizing a feedback current is implemented; and negative feedback is realized by adopting an oversampling technique, so that the linearity, the dynamic precision, etc. of a closed-loop system are improved. In addition, applying the SDM achieves quantized noise shaping so as to lower quantized noise and digital quantity output.

Operations of the SDM of the quartz pendulous accelerometer of the present disclosure includes a switching capacitive mode and a continuous time mode.

The quartz pendulous accelerometer adopting the capacitive mode includes a quartz meter 1, a C-V readout circuit 2, an oversampling unit 3, a control algorithm unit 4, a digital quantization unit 5, and an electromagnetic torque pulse control unit 7, where the quartz meter 1, the C-V readout circuit 2, the oversampling unit 3, the control algorithm unit 4, the digital quantization unit 5, and the electromagnetic torque pulse control unit 7 are successively connected to form a loop. The quartz pendulous accelerometer adopting the capacitive mode further includes a filtering and decimating unit 6, which employs down sampling filtering and is connected onto an output end of the digital quantization unit 5.

In the switching capacitive mode, the C-V readout circuit 2 converts a differential capacitance change between polar plates of capacitor due to an external acceleration input into a voltage change. Oversampling of the C-V readout circuit 2 is accomplished by timing control and the oversampling rate (OSR) is affected by factors such as system-level precision, power consumption, and circuit complexity. In one embodiment, for a quartz pendulous accelerometer with a bandwidth of 1 kHz, when a sampling rate is 128 kHz, the oversampling rate is 64. The oversampling rate and the order of an integrator directly determine a signal-to-noise ratio (SNQR) of a system signal to quantized noise, which will be described in detail when the order of the integrator is introduced later.

Figure 2:
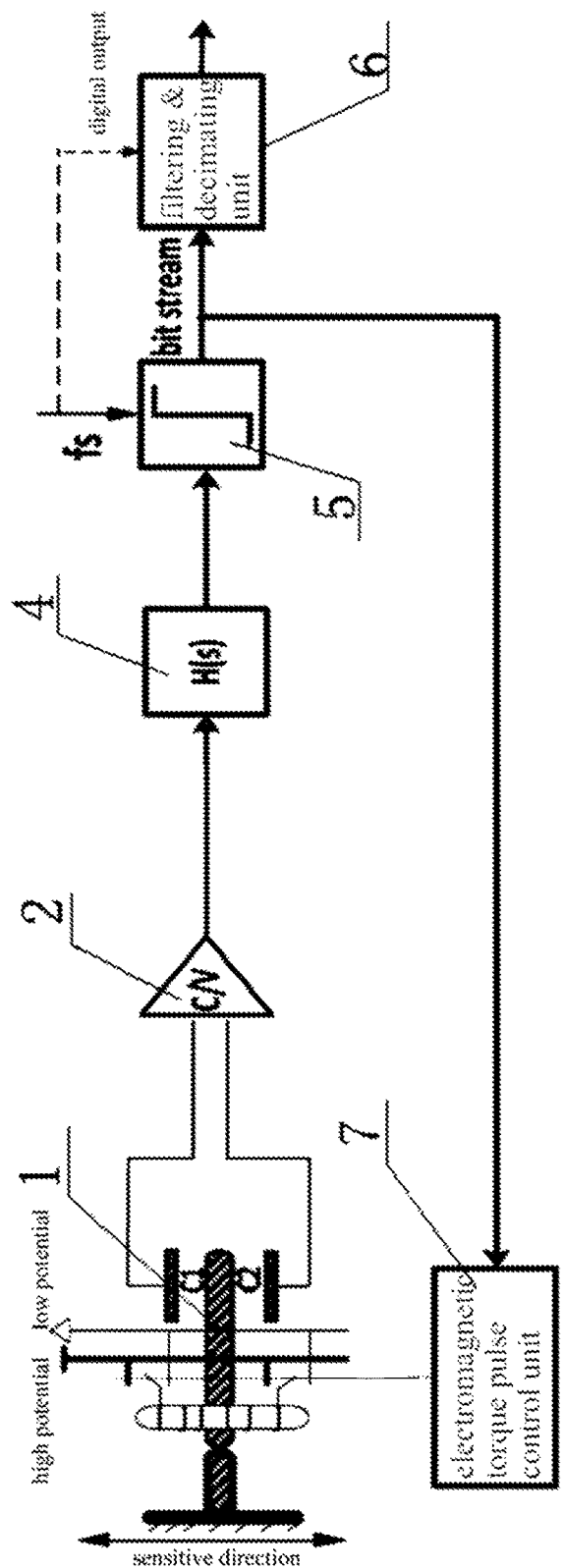
FIG. 2 is a schematic diagram showing a quartz pendulous accelerometer (continuous time mode) of the present disclosure.
Figure 3:
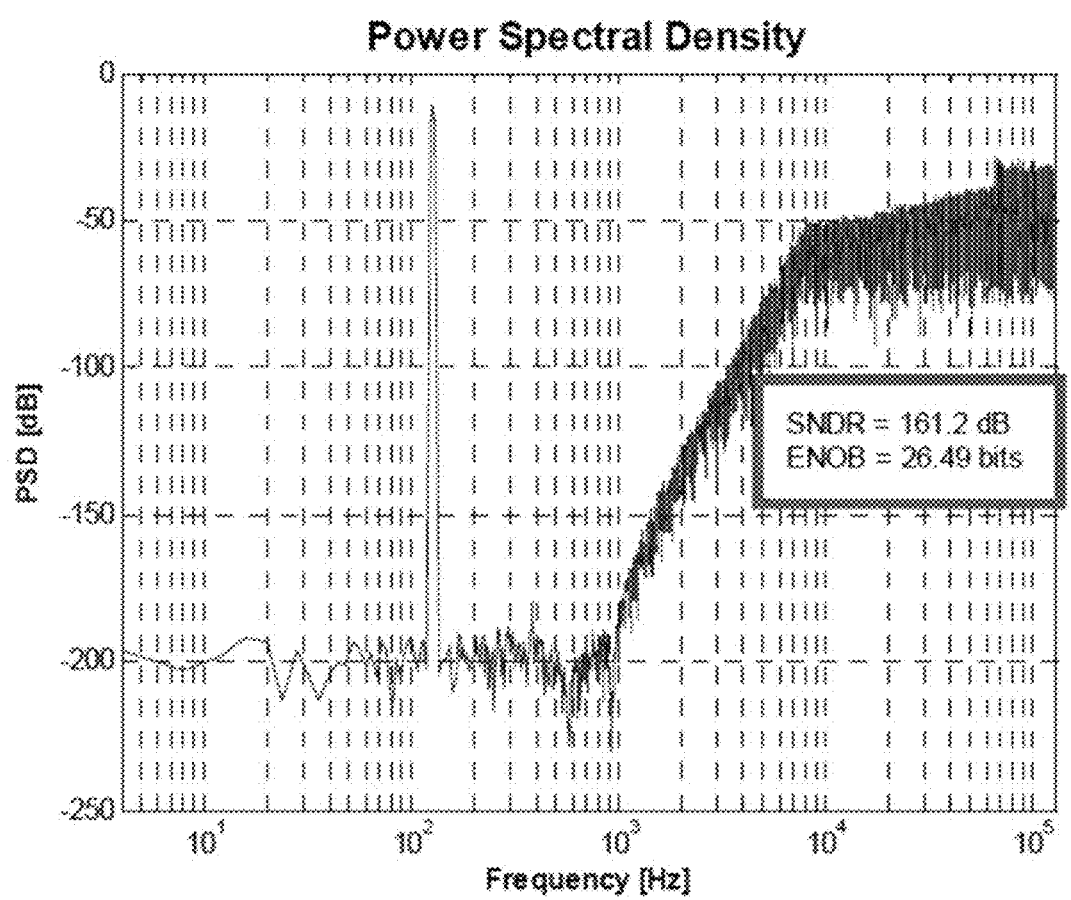
FIG. 3 is a schematic diagram showing an output PSD (161.2 dB) of a sixth-order quartz pendulous accelerometer.
Figure 4:
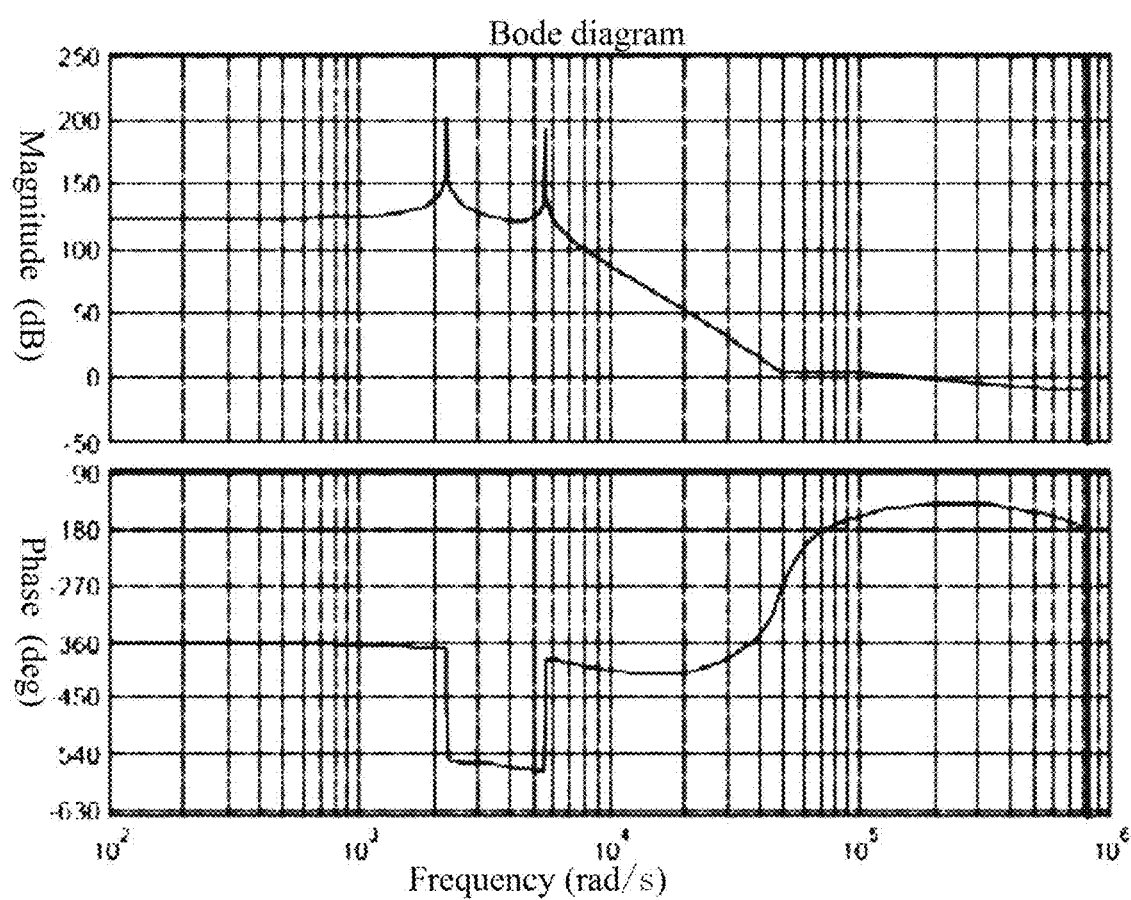
FIG. 4 is a frequency characteristic curve of a sixth-order signal transfer function.
Figure 5:
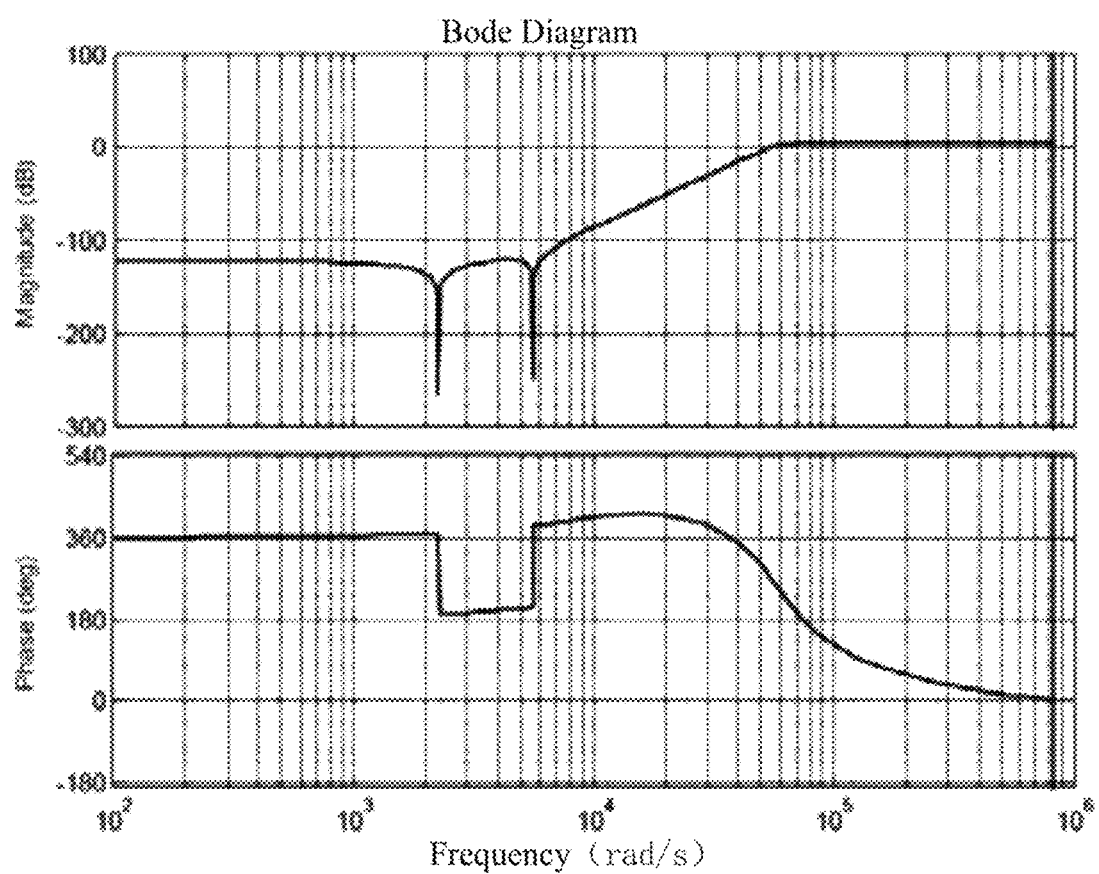
FIG. 5 is a frequency characteristic curve of a sixth-order noise transfer function.
Figure 6:
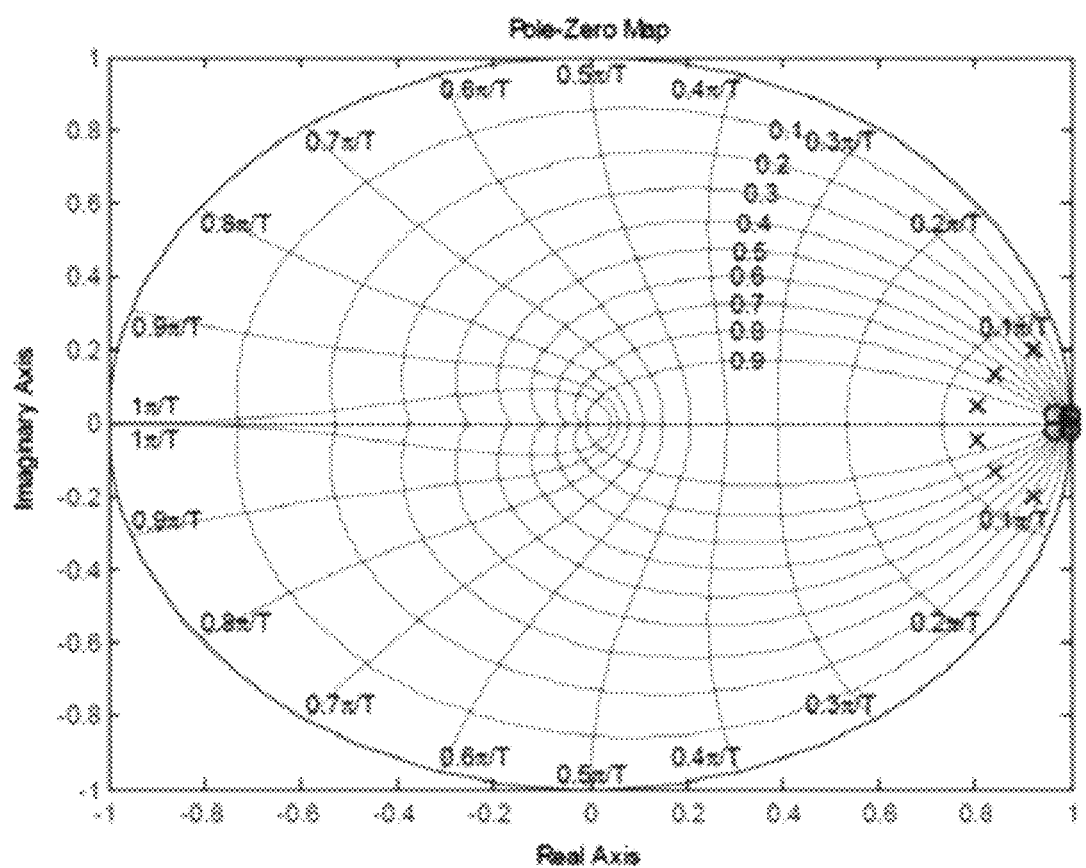
FIG. 6 is a schematic diagram showing a Pole-Zero point.

FIG. 2 illustrates another embodiment of the present disclosure. A continuous time mode is similar to a switching capacitive mode. The difference is that the oversampling of the continuous time mode is at the latter stage of a control algorithm, that is, oversampling is achieved by a quantitative comparison circuit so that the two are essentially the same. From the perspective of a control system, both are the conversion from the Z domain and the S domain. The following analysis is based on the switching capacitive mode (discrete domain is the Z domain). The same principle also applicable to the continuous time mode (continuous domain is the S domain).

The compensation circuit achieves phase compensation of the closed-loop system. The loop produces a phase lag of greater than 180 degrees due to the multi-order integrator, resulting in system instability. For a quartz meter with a high Q value, the compensation circuit is particularly important. For a discrete system, a transfer function of the simple compensation circuit may be equivalent to $(z-z_0)/z$, and phase compensation parameter setting is achieved by adjusting the position and the parameter of a zero point ($z_0$). For the closed-loop system of the quartz pendulous accelerometer, the multi-order integrator is introduced in the loop. As shown below, for example, two integrators, three integrators and four integrators are respectively introduced in a fourth-order SDM, a fifth-order SDM, and a sixth-order SDM. These integrators introduce the great challenge to the stability of the closed-loop system. As an example, in the fifth-order SDM, since the three integrators are introduced, an open-loop transfer frequency characteristic curve produces a 270-degree phase shift. In addition, for an occasion where extremely low noise is applied, the quartz meter of the quartz pendulous accelerometer needs to be subjected to vacuum encapsulation to reduce its thermal noise, resulting in a 180-degree phase shift at a resonance point of the quartz meter. Accordingly, designing a very precise phase compensation circuit is very necessary.

A loop filter circuit is composed of a multi-order integrator, its transfer function is as follows:

$$H(z)=(1-z^{-1})^n$$

where n represents the order of the integrator. For example, when n=4, an approximate second-order integrator of the quartz meter is added so that it is called a sixth-order SDM. For the traditional SDM, a signal-to-noise ratio (SQNR) of a useful signal to quantized noise is as follows:

$$SQNR^N(\text{dB}) = 10lg\frac{\sigma_x^2}{P_{QN}} = 6 + 10lg(2N+1) + 10(2N+1)lgOSR - 10N$$

This shows that the signal-to-noise ratio is correlated to the order N of the integrator and the oversampling rate (OSR). For a case where an acceleration sensitive means is embedded into the SDM, a signal-to-noise ratio of its signal to quantized noise may also refer to the above equation.

A multi-order integrator output signal generates a 1-bit data stream through a zero comparator circuit. The bit stream is loaded onto a constant-current source control circuit to apply timing control, which controls the conduction direction, the number of conduction periods, and determines a direction and a magnitude of the input acceleration signal, so that quantizing the feedback current is realized. The bit stream output by the comparator circuit is an oversampled modulated wave that includes information of an external input acceleration so that measurement of the input acceleration is realized. At this point, a closed-loop process of embedded quartz meter in the SDM is accomplished.

The output bit stream is oversampled so that the high rate of data presents a challenge to the processing of a DSP. In addition, a frequency spectrum of the output bit stream has a high-frequency noise portion resulting from noise shaping. There is a need for down-sampling to meet a Nyquist sampling rate of the processing of the DSP and to filter out high-frequency quantization noise components from the output bit stream. The down-sampled and filtered bit stream realizes measurement digitization of the input acceleration.

Figure 7:
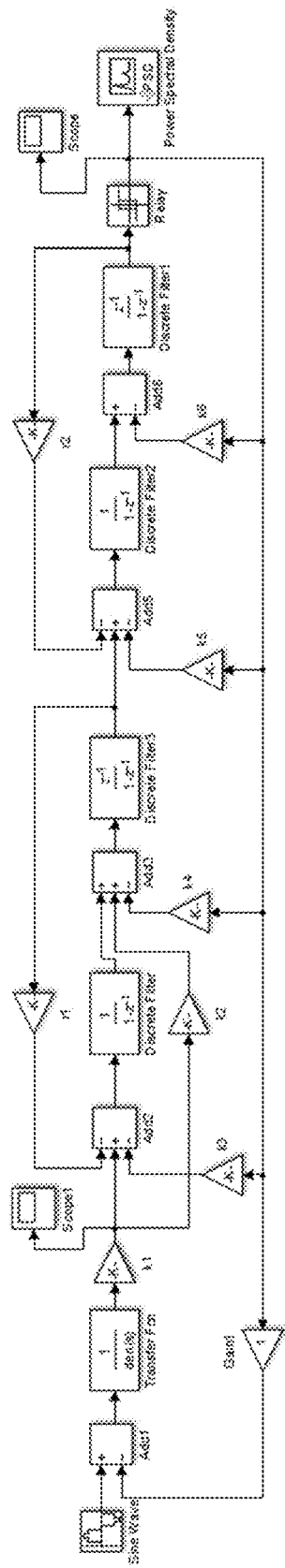
FIG. 7 is a schematic diagram showing a feed forward architecture with a resonance point.

A loop filter is implemented in a manner similar to the SDM architecture. Using a second-order quartz meter model of the quartz pendulous accelerometer and with the sixth-order SDM as an example, one embodiment of the system architecture is shown in FIG. 7.

This method is generally applicable to different system. In one embodiment, for a topology architecture with a resonance point, from a perspective of energy, the quantized noise shaping ability of the quartz pendulous accelerometer is improved, that is, the quantized noise is "fetched" from a working frequency band to a high frequency band, a location of the resonance point determines a location where the energy of the quantized noise that is "fetched."

A continuous time control architecture is similar to a loop filter architecture.

Figure 8:
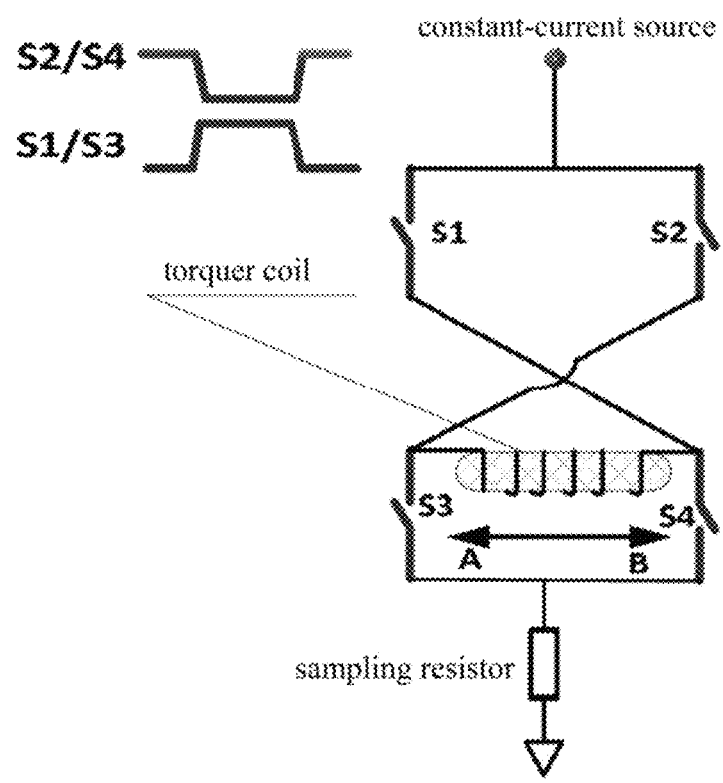
FIG. 8 is a timing control diagram of an electromagnetic torque pulse control unit.
Figure 9:
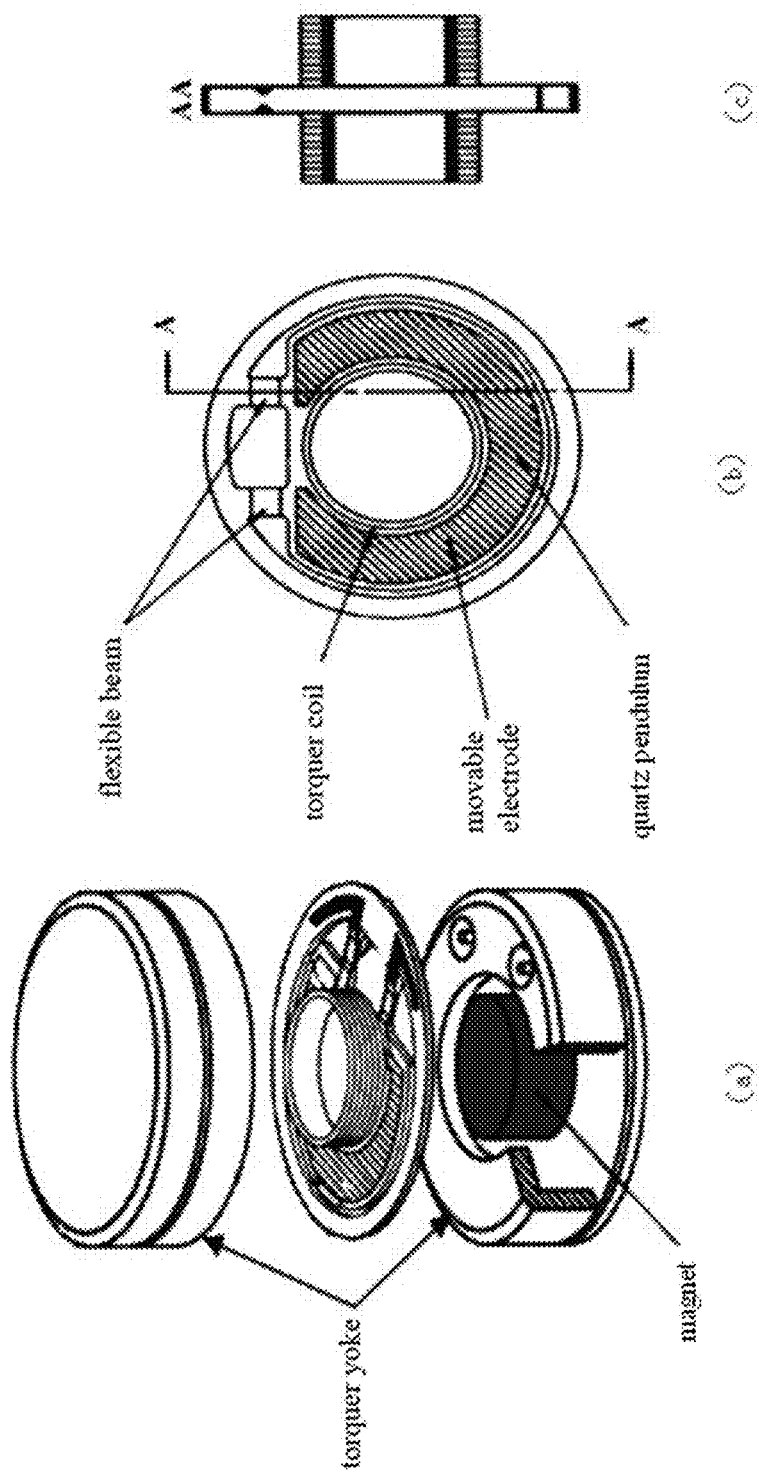
FIG. 9 panel (a) is an exploded view of a schematic diagram showing the quartz meter of a quartz pendulous accelerometer.

When the quartz meter of the quartz pendulous accelerometer is embedded into the closed-loop system of the SDM, one difficulty is the implementation of a driving current of a torquer. FIG. 8 illustrates, as one embodiment, a pulse density modulation for applying torque controlled by adopting a 1-bit data stream. In this embodiment, the current magnitude and a frequency loaded into the torquer are constant, but its polarity is modulated. In one sampling period, the sum of output positive and negative pulses serves as the measure of the acceleration.

FIG. 8 shows the 1-bit torquing method implemented by a logic circuit. A signal output from a control algorithm unit includes the polarity and the magnitude of electromagnetic torque. The digital quantization unit is determined by the polarity, making an output 1 or −1. The digital quantization unit is combined with a timing control unit so as to control ON/OFF of electronic switches S1, S2, S3 and S4. In one embodiment, when the output of the comparator circuit is 1, the S2/S4 is turned on, the S1/S3 is turned off, and the current flow direction of the coil is from A to B. In contrast, when the output of the comparator circuit is −1, the S1/S3 is turned on, the S2/S4 is turned off, the current flow direction of the coil is from B to A. The current flow direction in the coil indicates the direction of the electromagnetic torque, which balances the inertia torque produced by an external input acceleration. As such, the number of high and low levels (1 or −1) output by the digital quantization unit and the polarity characterize a magnitude and a polarity of the electromagnetic torque, and which serves as the measurement of the input acceleration. The above processes are all realized under the oversampling. The digital quantization unit outputs a 1-bit data stream, which includes information regarding a magnitude and a polarity of the acceleration. However, the bit stream signal is oversampled and is very large in size. Thus, for more conveniently providing the bit stream to a digital computer for further processing (for example, an IMU system having three quartz meters and three gyroscopes needs to acquire and process digital signals of the quartz meters), there is a need for down-sampling and filtering the output data stream. On the one hand, the sampling rate is reduced, and a number of the output bits is increased. On the other hand, the filter circuit filters out high-frequency signals outside a useful frequency band after noise shaping, thereby achieving a purpose of high-precision digital outputs by the quartz meters, and realizing digital closed loop and digital output of the quartz meters.

The foregoing is merely illustrative of preferred embodiments of the present disclosure and is not intended to limit the present disclosure in any form. While the present disclosure has been described above with reference to the preferred embodiments, it is not intended to limit the present disclosure. Any person skilled in the art will be able to make many possible variations and modifications to the technical solution of the present disclosure, or to equivalent embodiments of equivalent variations by using the above-disclosed methods and technical aspects, without departing from a scope of the technical solution of the present disclosure. Accordingly, aspects without departing from the technical solution of the present disclosure, as well as any simple modifications, equivalent variations and modifications made to the above embodiments according to the technical essence of the present disclosure fall within the scope protected by the technical solution of the present disclosure.

The invention claimed is:

1. A quartz pendulous accelerometer, comprising:
   a quartz meter, which is configured to sense an acceleration signal, and convert the acceleration signal into an inertia torque and convert the inertia torque into a meter output signal;
   a capacitance-to-voltage (C-V) readout circuit, which is configured to convert the meter output signal into an input signal recognizable by a pulse generating apparatus; and
   the pulse generating apparatus, which is configured to perform control algorithm conversion, oversampling and digital quantization on the input signal to obtain a quantized current pulse,
   wherein the quantized current pulse is an oversampled modulated signal comprising information about a magnitude and a polarity of a feedback force and is converted into an electromagnetic pulse torque for balancing the inertia torque.

2. The quartz pendulous accelerometer according to claim 1, wherein the pulse generating apparatus comprises a control algorithm unit, an oversampling unit, and a digital quantization unit.

3. The quartz pendulous accelerometer according to claim 2, wherein the oversampling unit is configured to perform oversampling on the input signal recognizable by the pulse generating apparatus;
   the control algorithm unit is configured to convert the oversampled input signal into a control signal, the input signal being a voltage signal; and
   the digital quantization unit is configured to quantize the control signal into an output bit stream signal.

4. The quartz pendulous accelerometer according to claim 2, wherein the control algorithm unit is configured to perform control algorithm conversion to convert the input signal recognizable by the pulse generating apparatus into a control signal;
   the oversampling unit is configured to perform oversampling on the control signal; and
   the digital quantization unit is configured to perform digital quantization to quantize the oversampled control signal into an output bit stream signal.

5. The quartz pendulous accelerometer according to claim 1, wherein the quartz pendulous accelerometer further comprises an electromagnetic torque pulse control unit.

6. The quartz pendulous accelerometer according to claim 5, wherein the electromagnetic torque pulse control unit comprises a timing control unit and a constant-current source unit.

7. The quartz pendulous accelerometer according to claim 6, wherein the electromagnetic torque pulse control unit receives the quantized current pulse, and the timing control unit determines a direction and a magnitude of the acceleration signal by switching a conduction direction and a number of conduction periods of the constant-current source unit, and performs feedback control on an electromagnetic torquer of the quartz meter for balancing the inertia torque.

8. The quartz pendulous accelerometer according to claim 1, wherein the quantized current pulse is a bit stream signal.

9. The quartz pendulous accelerometer according to claim 1, wherein the meter output signal is a capacitance signal, and the C-V readout circuit converts the capacitance signal into a voltage signal recognizable by the pulse generating apparatus.

10. The quartz pendulous accelerometer according to claim 3, wherein the control algorithm unit comprises a compensation unit, which performs phase compensation on a closed-loop circuit of the quartz pendulous accelerometer.

11. The quartz pendulous accelerometer according to claim 1, wherein the quartz meter mainly comprises a quartz pendulum, a torquer yoke, a torquer coil and a magnet; and
wherein the quartz pendulum and end faces of the torquer yoke make up differential capacitors, an upper gold-plated face and a lower gold-plated face of the quartz pendulum act as movable polar plates of the differential capacitors, and the torquer yoke acts as stationary polar plates of the differential capacitors.

12. The quartz pendulous accelerometer according to claim 1, wherein the quartz pendulous accelerometer further comprises a filtering and decimating unit, which is configured to perform down-sampling and filtering on the quantized current pulse to output a digital quantity signal.

13. A closed-loop control method for a quartz pendulous accelerometer, the method comprising:
providing a quartz meter, which is configured to sense an acceleration signal, and convert the acceleration signal into an inertia torque and convert the inertia torque into a meter output signal;
converting, using a capacitance-to-voltage (C-V) readout circuit, the meter output signal into an input signal recognizable by a pulse generating apparatus and inputting the input signal to the pulse generating apparatus; and
performing control algorithm conversion, oversampling and digital quantization on the input signal to obtain a quantized current pulse,
wherein the quantized current pulse is an oversampled modulated signal comprising information about a magnitude and a polarity of a feedback force and is converted into an electromagnetic pulse torque for balancing the inertia torque.

14. The closed-loop control method for a quartz pendulous accelerometer according to claim 13, wherein the pulse generating apparatus sequentially performs oversampling, control algorithm conversion, and digital quantization on the input signal to output the quantized current pulse.

15. The closed-loop control method for a quartz pendulous accelerometer according to claim 13, wherein the pulse generating apparatus sequentially performs control algorithm conversion, oversampling, and digital quantization on the input signal to output the quantized current pulse.

16. The closed-loop control method for a quartz pendulous accelerometer according to claim 14, further comprising:
providing an oversampling unit, which is configured to perform oversampling on the input signal;
providing a control algorithm unit, which is configured to convert the oversampled input signal into a control signal; and
providing a digital quantization unit, which is configured to quantize the control signal into an output bit stream.

17. The closed-loop control method for a quartz pendulous accelerometer according to claim 15, further comprising:
providing a control algorithm unit, which is configured to convert the input signal into a control signal;
providing an oversampling unit, which is configured to convert the control signal into an oversampled control signal; and
providing a digital quantization unit, which is configured to quantize the oversampled control signal into an output bit stream.

18. The closed-loop control method for a quartz pendulous accelerometer according to claim 13,
wherein the meter output signal is a capacitance signal, and the input signal recognizable by the pulse generating apparatus is a voltage signal; and
the capacitance signal is converted into a voltage signal recognizable by the pulse generating apparatus using the C-V readout circuit.

19. The closed-loop control method for a quartz pendulous accelerometer according to claim 13, the method further comprising:
providing an electromagnetic torque pulse control unit, which comprises a timing control unit and a constant-current source unit;
wherein the electromagnetic torque pulse control unit receives the quantized current pulse, and
wherein the timing control unit determines a direction and a magnitude of the acceleration signal by switching a conduction direction and a number of conduction times of the constant-current source unit by timing control, and performs feedback control on an electromagnetic torquer of the quartz meter for balancing the inertia torque.

20. The closed-loop control method for a quartz pendulous accelerometer according to claim 16, further comprising:
providing a compensation unit, which is configured to perform phase compensation on a closed-loop circuit of the quartz pendulous accelerometer.

21. The closed-loop control method for a quartz pendulous accelerometer according to claim 13, wherein the quantized current pulse is a bit stream signal.

* * * * *